(12) United States Patent
Salame et al.

(10) Patent No.: US 10,863,031 B1
(45) Date of Patent: *Dec. 8, 2020

(54) NETWORKED CONTACT CENTER USER INTERFACE APPROACH

(71) Applicant: 8x8, Inc., San Jose, CA (US)

(72) Inventors: Mansour Salame, Atherton, CA (US); Richard Southwick, San Francisco, CA (US); William James Fernandez, Albuquerque, NM (US); Robert Townsend, Mt. View, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/394,623

(22) Filed: Apr. 25, 2019

Related U.S. Application Data

(63) Continuation of application No. 15/384,072, filed on Dec. 19, 2016, now Pat. No. 10,298,767, which is a continuation of application No. 14/974,759, filed on Dec. 18, 2015, now Pat. No. 9,531,879, which is a continuation of application No. 14/629,577, filed on Feb. 24, 2015, now Pat. No. 9,225,832, which is a continuation of application No. 12/201,573, filed on Aug. 29, 2008, now Pat. No. 8,972,885.

(51) Int. Cl.
| | |
|---|---|
| *G06F 3/0481* | (2013.01) |
| *H04M 3/523* | (2006.01) |
| *H04M 3/51* | (2006.01) |
| *H04M 3/42* | (2006.01) |
| *H04L 12/58* | (2006.01) |

(52) U.S. Cl.
CPC .......... *H04M 3/5237* (2013.01); *H04L 51/04* (2013.01); *H04M 3/42161* (2013.01); *H04M 3/5133* (2013.01); *H04M 3/5191* (2013.01); *H04M 2203/256* (2013.01)

(58) Field of Classification Search
CPC ... G06F 3/0481; G06F 3/0484; H04M 3/5133
See application file for complete search history.

(56) References Cited

U.S. PATENT DOCUMENTS

| | | |
|---|---|---|
| 4,723,238 A | 2/1988 | Isreal et al. |
| 4,809,272 A | 2/1989 | Torgrim et al. |
| (Continued) | | |

FOREIGN PATENT DOCUMENTS

| | | |
|---|---|---|
| WO | WO2010025110 A1 | 3/2010 |
| WO | WO2010025112 A1 | 3/2010 |
| WO | WO2010025113 A1 | 3/2010 |

OTHER PUBLICATIONS

"U.S. Appl. No. 12/201,599, Preliminary Amendment dated Dec. 8, 2009", 10 pgs.

(Continued)

*Primary Examiner* — Phenuel S Salomon
(74) *Attorney, Agent, or Firm* — Crawford Maunu PLLC

(57) ABSTRACT

This document is directed to, among other things, communication systems involving networked contact center interfaces. One example method includes presenting a frame on a user interface to present information in a selectable format. Another example method includes using a circuit device to detect selection of a frame as displayed and causing display of further graphical information in an un-selectable format.

20 Claims, 13 Drawing Sheets

(56) References Cited

U.S. PATENT DOCUMENTS

| | | | |
|---|---|---|---|
| 5,117,452 A | 5/1992 | Callele et al. | |
| 5,210,789 A | 5/1993 | Jeffus et al. | |
| 5,625,676 A * | 4/1997 | Greco | H04M 1/575 |
| | | | 379/88.11 |
| 5,754,636 A * | 5/1998 | Bayless | H04M 1/575 |
| | | | 379/142.1 |
| 5,799,061 A * | 8/1998 | Melcher | H04M 11/04 |
| | | | 379/45 |
| 5,887,139 A | 3/1999 | Madison, Jr. et al. | |
| 6,005,931 A | 12/1999 | Neyman et al. | |
| 6,154,465 A | 11/2000 | Pickett | |
| 6,201,863 B1 | 3/2001 | Miloslavsky | |
| 6,278,777 B1 * | 8/2001 | Morley | H04M 3/5158 |
| | | | 379/265.02 |
| 6,285,364 B1 * | 9/2001 | Giordano, III | H04M 1/2477 |
| | | | 715/804 |
| 6,295,551 B1 | 9/2001 | Roberts et al. | |
| 6,317,727 B1 | 11/2001 | May | |
| 6,330,005 B1 | 12/2001 | Tonelli et al. | |
| 6,381,324 B1 * | 4/2002 | Shaffer | H04M 3/4228 |
| | | | 379/207.12 |
| 6,392,666 B1 | 5/2002 | Hong et al. | |
| 6,393,467 B1 | 5/2002 | Potvin | |
| 6,466,663 B1 * | 10/2002 | Ravenscroft | G06F 3/0481 |
| | | | 379/265.01 |
| 6,493,447 B1 | 12/2002 | Goss et al. | |
| 6,553,115 B1 * | 4/2003 | Mashinsky | H04M 1/275 |
| | | | 379/355.01 |
| 6,687,241 B1 * | 2/2004 | Goss | H04L 29/06 |
| | | | 370/352 |
| 6,741,698 B1 | 5/2004 | Jensen | |
| 6,760,429 B1 | 7/2004 | Hung et al. | |
| 6,804,345 B1 * | 10/2004 | Bala | H04M 3/382 |
| | | | 379/265.04 |
| 6,999,990 B1 | 2/2006 | Sullivan et al. | |
| 7,028,091 B1 | 4/2006 | Tripathi et al. | |
| 7,028,331 B2 | 4/2006 | Schwalb | |
| 7,124,171 B1 * | 10/2006 | McCann | H04L 29/12283 |
| | | | 709/216 |
| 7,224,783 B2 * | 5/2007 | Creamer | G06Q 20/102 |
| | | | 379/127.01 |
| 7,328,001 B2 | 2/2008 | Dawson et al. | |
| 7,366,293 B2 * | 4/2008 | Ezerzer | H04L 41/0893 |
| | | | 379/265.09 |
| 7,403,995 B2 | 7/2008 | Mace et al. | |
| 7,480,719 B2 | 1/2009 | Inoue | |
| 7,610,388 B2 | 10/2009 | Yamamoto | |
| 7,627,658 B2 | 12/2009 | Levett et al. | |
| 7,644,172 B2 | 1/2010 | Stewart et al. | |
| 7,730,204 B2 | 6/2010 | Pak | |
| 7,784,021 B2 | 8/2010 | Boyette et al. | |
| 8,065,618 B2 | 11/2011 | Kumar et al. | |
| 8,365,097 B2 * | 1/2013 | Jager | G06F 3/0482 |
| | | | 715/845 |
| 9,225,832 B1 | 12/2015 | Salame et al. | |
| 2002/0198943 A1 | 12/2002 | Zhuang et al. | |
| 2003/0123640 A1 | 7/2003 | Roelle et al. | |
| 2003/0172131 A1 | 9/2003 | Ao | |
| 2003/0195934 A1 | 10/2003 | Peterson et al. | |
| 2003/0195943 A1 | 10/2003 | Bradshaw et al. | |
| 2003/0208754 A1 | 11/2003 | Sridhar et al. | |
| 2003/0236907 A1 | 12/2003 | Stewart et al. | |
| 2004/0073508 A1 | 4/2004 | Foster et al. | |
| 2004/0083292 A1 | 4/2004 | Lueckhoff et al. | |
| 2004/0088208 A1 * | 5/2004 | Runge | G06Q 10/0633 |
| | | | 705/7.31 |
| 2004/0088300 A1 | 5/2004 | Avery et al. | |
| 2005/0041647 A1 | 2/2005 | Stinnie | |
| 2005/0047579 A1 | 3/2005 | Mansour | |
| 2005/0132298 A1 | 6/2005 | Lueckhoff et al. | |
| 2005/0135600 A1 * | 6/2005 | Whitman, Jr. | H04M 3/51 |
| | | | 379/266.08 |
| 2005/0188331 A1 * | 8/2005 | Shimada | G06F 9/453 |
| | | | 715/816 |
| 2005/0193055 A1 | 9/2005 | Angel et al. | |
| 2006/0026304 A1 | 2/2006 | Price | |
| 2006/0239440 A1 * | 10/2006 | Shaffer | H04M 3/523 |
| | | | 379/265.02 |
| 2006/0256953 A1 | 11/2006 | Pulaski et al. | |
| 2007/0127665 A1 | 6/2007 | Brandt et al. | |
| 2007/0162908 A1 | 7/2007 | Erickson et al. | |
| 2007/0192414 A1 | 8/2007 | Chen et al. | |
| 2007/0192415 A1 * | 8/2007 | Pak | G06Q 30/02 |
| | | | 709/206 |
| 2007/0211881 A1 | 9/2007 | Parker-Stephen | |
| 2008/0010084 A1 | 1/2008 | Castro et al. | |
| 2008/0037760 A1 | 2/2008 | Boughton et al. | |
| 2008/0072264 A1 | 3/2008 | Crayford | |
| 2008/0134071 A1 * | 6/2008 | Keohane | G06F 3/038 |
| | | | 715/769 |
| 2008/0177994 A1 | 7/2008 | Mayer | |
| 2008/0178278 A1 | 7/2008 | Grinstein et al. | |
| 2009/0055195 A1 | 2/2009 | Karlsgodt | |
| 2009/0061850 A1 | 3/2009 | Li et al. | |
| 2009/0064148 A1 | 3/2009 | Jaeck et al. | |
| 2009/0066788 A1 | 3/2009 | Baum et al. | |
| 2009/0067586 A1 | 3/2009 | Fano et al. | |
| 2009/0133031 A1 | 5/2009 | Inoue | |
| 2009/0190728 A1 * | 7/2009 | Bushnell | H04M 3/533 |
| | | | 379/88.17 |
| 2009/0216683 A1 | 8/2009 | Gutierrez | |
| 2009/0217180 A1 * | 8/2009 | Tovino | H04M 3/42161 |
| | | | 715/762 |
| 2009/0307001 A1 | 12/2009 | Gill et al. | |
| 2010/0054439 A1 | 3/2010 | Salame et al. | |
| 2010/0054448 A1 | 3/2010 | Townsend et al. | |
| 2010/0054450 A1 | 3/2010 | Southwick et al. | |
| 2010/0054451 A1 | 3/2010 | Townsend | |
| 2010/0057927 A1 | 3/2010 | Southwick et al. | |
| 2010/0232583 A1 | 9/2010 | Bettis et al. | |

OTHER PUBLICATIONS

"U.S. Appl. No. 12/201,639, Preliminary Amendment dated Jul. 1, 2010", 11 pgs.

"U.S. Appl. No. 12/201,671, Final Office Action dated Dec. 14, 2010", 24 pgs.

"U.S. Appl. No. 12/201,671, Response Filed Jun. 14, 2011 to Final Office Action dated Dec. 14, 2010", 14 pgs.

"U.S. Appl. No. 12/201,671, Response filed Sep. 28, 2010 to Non Final Office Action dated Jun. 28, 2010", 11 pgs.

"U.S. Appl. No. 12/201,726, Final Office Action dated Apr. 18, 2011", 16 pgs.

"U.S. Appl. No. 12/201,726, Non-Final Office Action dated Oct. 12, 2010", 17 pgs.

"U.S. Appl. No. 12/201,726, Response filed Jan. 12, 2011 to Non-Final Office Action dated Oct. 12, 2010", 13 pgs.

"U.S. Appl. No. 12/201,726, Response filed Jun. 20, 2011 to Final Office Action dated Apr. 18, 2011", 14 pgs.

Fielding, et al., "HTTP/1.1: Connections, 8 Connections", Part of Hypertext Transfer Protocol—HTTP/1.1, RFC 2616, [Online]. Retrieved from the Internet Jan. 12, 2011: <URL: http://www.w3.org/Protocols/rfc2616/rfc2616-sec8.html>, 6 pgs.

Fielding, R., et al., "Hypertext Transfer Protocol—HTTP/1.1, Chapters 1-9.1.2", (Jun. 1999), 22 pgs.

Infrequently Noted, "Comet: Low Latency Data for the Browser", [Online]. Retrieved from the Internet: <URL:http://infrequently.org/2006/03/comet-low-latency-data-for-thebrowser>, (Mar. 3, 2006), 5 pgs.

McCarthy, Philip, "Ajax for Java developers: Write scalable Comet applications with Jetty and Direct Web Remoting", [Online]. Retrieved from the Internet: <URL: http://www.ibm.com/developerworks/java/library/j-jettydwr/index.html>, (Jul. 17, 2007), 16 pgs.

"U.S. Appl. No. 12/201,671 Non-Final Office Action dated Jun. 28, 2010", 21 pgs.

"International Application Serial No. PCT/US2009/054780, Search Report and Written Opinion dated Oct. 8, 2009".

(56) References Cited

OTHER PUBLICATIONS

"International Application Serial No. PCT/US2009/054787, Search Report dated Oct. 13, 2009".
"International Application Serial No. PCT/US2009/054787, Written Opinion dated Oct. 13, 2009".
"International Application Serial No. PCT/US2009/054788, Search Report dated Oct. 13, 2009".
"International Application Serial No. PCT/US2009/054788, Written Opinion dated Oct. 13, 2009".
Brown, Donald E, "The Interaction Center Platform", Interactive Intelligence, Inc., (2005), 35 pgs.

* cited by examiner

NETWORKED CONTACT CENTER USER INTERFACE APPROACH

TECHNICAL FIELD

This patent document pertains generally to communication systems involving networked contact center interfaces.

BACKGROUND

Traditional, contact centers are referred to as call centers, which are designed to enable a company to handle calls from their clients. The calls received from clients may be distributed to multiple call agents according to certain call distribution and handling methodologies. Ideally, a call center is designed to handle calls with minimal client waiting time, minimal dropped calls, even call distribution to agents, and minimal downtime. Any drastic fluctuations in one or more of these criteria may result in loss of business and/or customer satisfaction.

Traditional call centers are normally built to be operated on-premise using proprietary systems with propriety hardware and software. These on-premise call center systems are generally very costly to maintain. The systems typically require support staff. Furthermore, the systems may be inflexible in the type of applications and hardware that can be supported, limiting the company's ability to upgrade and grow along with any potential increase in demand. Even when the upgrade options are available, they tend to be very costly and may require replacing a current system with another more advanced system, causing further stress to the supporting staff, the agents and the clients.

BRIEF DESCRIPTION OF DRAWINGS

Some embodiments are illustrated by way of example and not limitation in the figures of the accompanying drawings in which.

DETAILED DESCRIPTION

Figure 1:
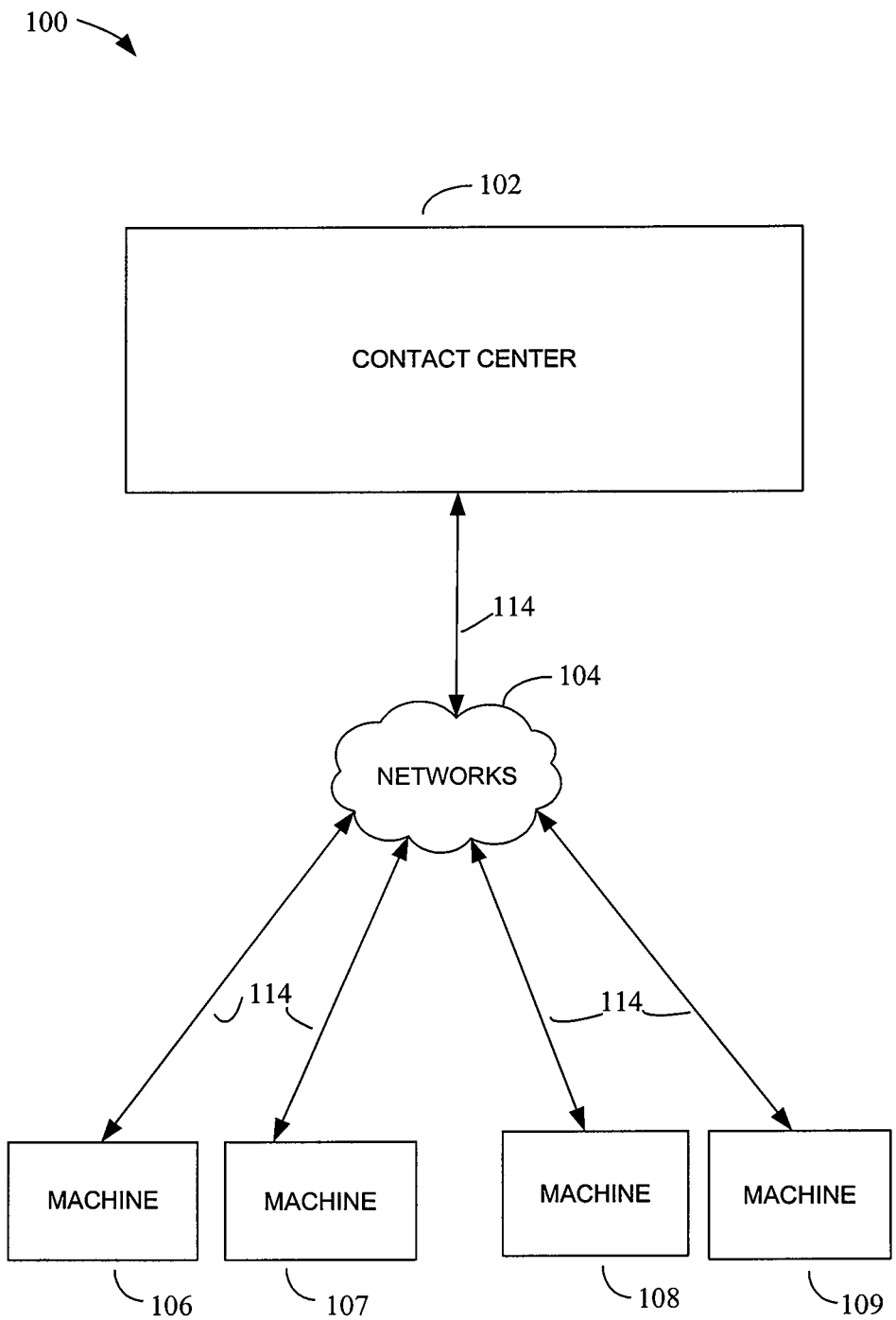
FIG. 1 is a high level diagrammatic representation of an on-demand contact center, according to an example embodiment.

An example web based user interface for a networked contact center displays information related to voice calls, chats and emails. A web based user interface may be provided to allow a tenant's agent or an agent's supervisor to communicate and to access information about the contact managed by the networked contact center. Some relevant information may include a list of calls waiting in a queue, subject matter of a customer's question, an agent's average time to resolve an issue, the names of all the agents currently available to help customers and other contact center related information of the sort.

An example transaction panel of the user interface may be constructed to allow an agent to manipulate a particular set of frames for a particular channel of communication. The user interface may include one or more sections. Each of the sections may be used to display related information. Merely for simplicity, each section may be referred to as a frame which may or may not be associated with visible boundaries. In various example embodiments, frames in the user interface are used to initiate (e.g., dialing) and respond to (e.g., finding in a queue and responding) customer contact. In some example embodiments, a frame used for these purposes presents information in a format that makes the frame selectable. Based on the frame being selected, the frame may display further information in an un-selectable format. In an example embodiment, the first information may be associated with a function that is to be initiated by selecting the frame (e.g., a button to dial a call). The second information may be associated with a status existing subsequent to the initiation of the function (e.g., displaying a dialing status).

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice embodiments of the invention. The embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Contact Center

FIG. 1 is a block diagram showing an example networked contact center 100, in accordance with an example embodiment. FIG. 1 is shown to include a contact center 102 that is communicatively coupled with networks 104, via transmission media 114. Also communicatively coupled with the networks 104 via the transmission media 114 are machines 106-109. One or more of the machines 106-109 may be used by call agents or call supervisors associated with a company (also referred to as a tenant). One or more of the machines 106-109 may be used by customers or potential customers of the company.

The networks 104 may be used to communicatively couple the contact center 102 with the machines 106-109. In an example embodiment, networks 104 include the Internet and a public switched telephone network (PSTN). Other types of networks may be included within the networks 104 without departing from the claimed subject matter. The transmission media 114 may include any transmission media appropriate for supporting the networks 104. In an example embodiment, the transmission media 114 may include one or more of optical fiber, twisted pairs and wireless media. Other transmission media not described may also be used.

Contact made between the contact center 102 and the various machines 106-109 may include various modes of communications (e.g., electronic communications) that may be digitally encoded, composed of analog signals and/or include a combination of digital and analog communication. Some example types of contact may include communications made via Voice Over Internet Protocol (VOIP), analog telephone, online chat, audio/visual links (e.g., web cams and video phones), text messaging, electronic mail (email), video conferencing, screen sharing, web conferencing, file sharing and/or radio broadcast, etc. It is to be appreciated that example forms of communication are provided herein to illustrate types of contact and not to limit the meaning of contact to certain forms of communication.

The contact center 102 may perform various contact-related tasks (described in more detail below), on behalf of one or more tenants. The contact center 102 may be implemented in software, hardware or a combination of both software and hardware. The contact center 102 may comprise contact center machines (not shown) that execute instructions to perform the various contact related tasks (e.g., call distribution, call routing, call prioritizing, call transferring, etc.). One or more of the contact center machines may include interface hardware to communicate with the machines 106-109 via the transmission media 114 and the networks 104. It may be noted that the number of customers, agents or supervisors (and e.g., machines used by the customers, agent and supervisors) that communicate with the contact center 102 may be significantly increased when the number of tenants supported by the contact center 102 also increases. One or more of the contact center machines 106-109 may access data associated with the one or more tenants. The data may include, for example, tenant-specific call configuration, agents' identification, supervisors' identification, call recordings, call statistics, etc. For some example embodiments, there may be multiple instances of the same data that may be used as redundant date and for recovery purposes.

Tenant

A tenant is an entity (e.g., a company, an employer, team, division, department, or any other entity having agents and customers. etc.) that seeks to address contact made by other entities (e.g., customers, employees, associates, etc.) with which the tenant has a relationship. To help respond to such contact, an example tenant may use the contact center 102 to receive the contact, organize the contact, allocate the contact, transmit the contact and to perform other contact center related services for the benefit of the tenant. In addition to using the contact center 102, a tenant may look to yet further entities (e.g., agents, consultants, business partners, etc.) to help address the various contact referred to above (e.g., contact from the customers, associates, etc.).

Entities such as, for example, agents and customers may transmit and/or receive communications using the machines 106-109. The machines 106-109 may include interface hardware (not shown) and software to transmit and/or receive communications via the transmission media 114 to and/or from the networks 104 and the contact center 102. It is to be noted that the machines 106-109 may represent different types of machines (e.g., personal computers (PCs), mobile devices, telephones or any other network device). In an example embodiment, an entity associated with the machine 106 is a tenant's agent and a different entity associated with the machine 108 is the tenant's customer. In various example embodiments, on behalf of the tenant, the agent using the machine 106 may communicate via the networks 104 and the contact center 102 with the customer that is using the machine 108.

Contact Center Functional Modules

Figure 2:
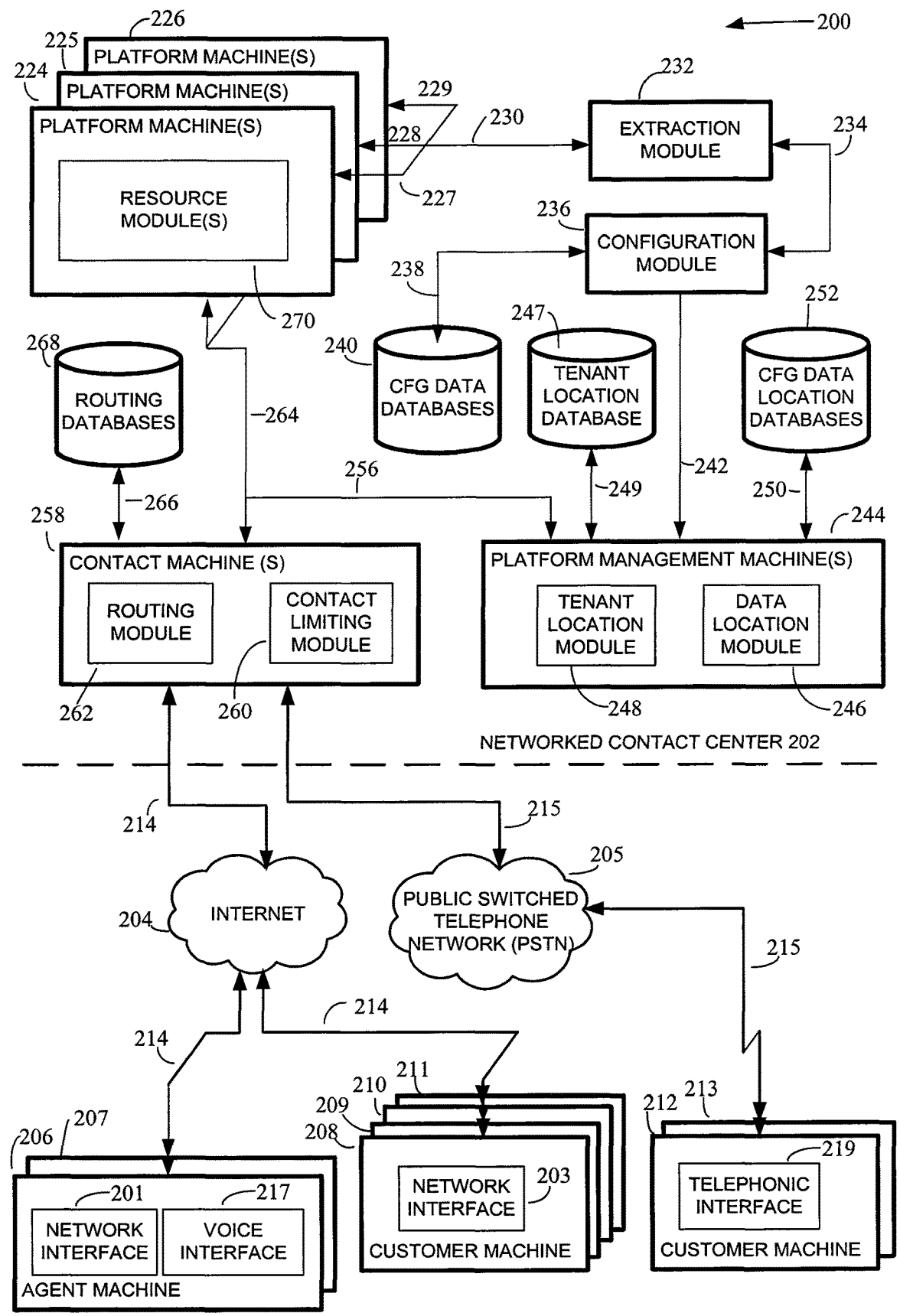
FIG. 2 is a further diagrammatic representation of an on-demand contact center, according to an example embodiment.

FIG. 2 is a block diagram illustrating a network 200, in accordance with an example embodiment. The network 200 is shown to include an example networked contact center 202 communicatively coupled with agent machines 206 and 207 and customer machines 208-211 via the transmission media 214 of the Internet 204. The example networked contact center 202 is further communicatively coupled with customer machines 212 and 213 via the transmission media 215 of the PSTN 205.

Although the current example may illustrate customers and agents associated with one tenant, it is to be understood that the networked contact center 202 may be configured to support or host multiple tenants (and therefore may also be referred to as a hosted networked contact center or just a hosted contact center). For some example embodiments, the tenants may not need to install any call-distribution system on-premise. To host these multiple tenants, the networked contact center 202 may include multiple platforms and databases to store configurations specific to each tenant. The networked contact center 202 may also implement redundancy and recovery schemes to reduce system down time.

Figure 3:
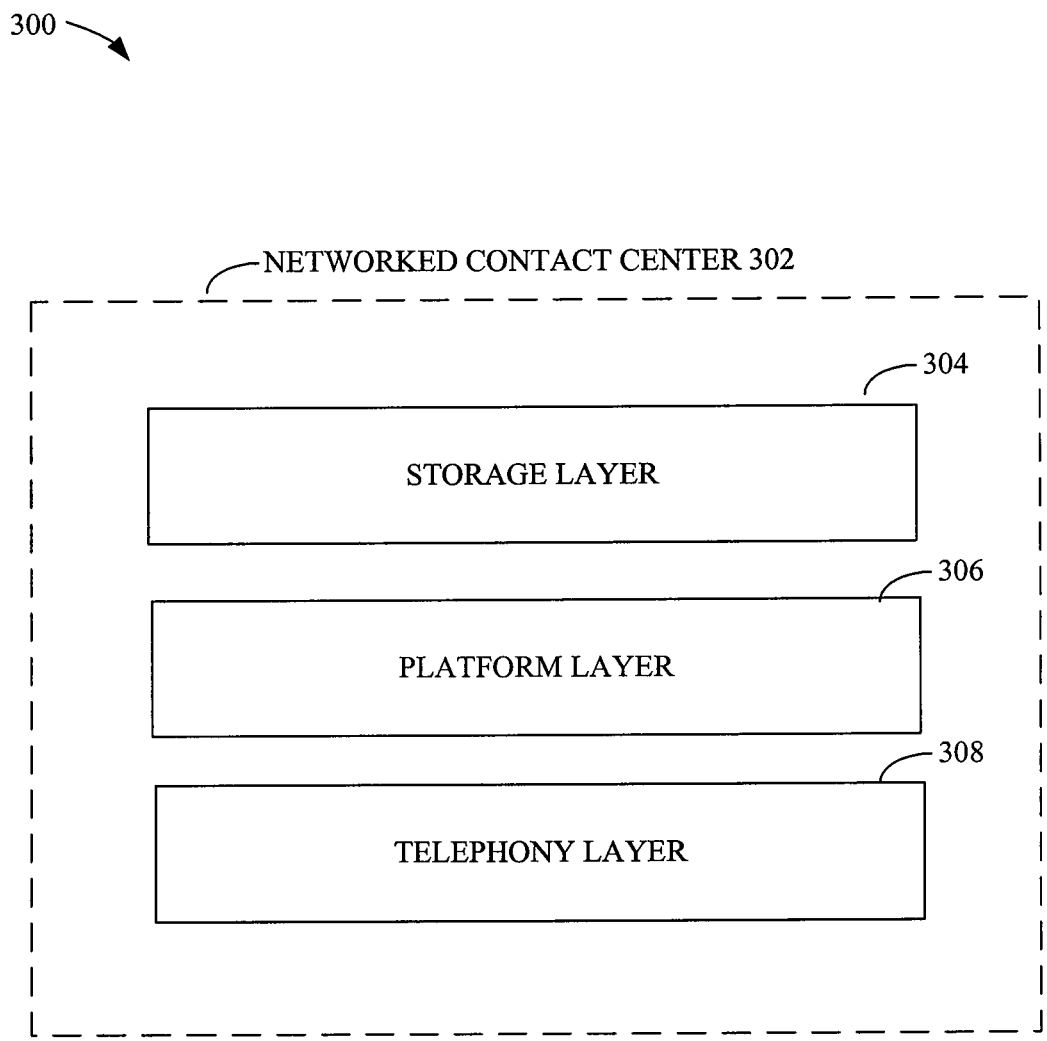
FIG. 3 is a block diagram illustrating a further network including a networked contact center 302 organized into layers, in accordance with an example embodiment.

FIG. 3 is a block diagram illustrating a further network 300 including networked contact center 302 organized into layers, in accordance with an example embodiment. The networked contact center 302 may be substantially similar to the networked contact center 202 of FIG. 2. The networked contact centers 202, 302 may be organized into multiple logical groups or layers. There may be a storage layer 304, a platform layer 306 and a telephony layer 308. For some example embodiments, the telephony layer 308 may be responsible for receiving calls that come into the networked contact centers 202, 302. Depending on the dialed number associated with the call, the telephony layer 308 distributes the call to an appropriate platform in the platform layer 306. For some example embodiments, each platform in the platform layer 306 may be associated with one or more machines (also referred to as platform machines). Each platform machine (e.g., server) may support one or more tenants. For some example embodiments, each tenant may be associated with two or more platforms. A first platform may be used for a tenant as an active platform, and one or more other platforms may be used for the tenant as an inactive platform that is available in the event the active platform becomes unavailable. A tenant may use multiple platforms as inactive platforms available to provide resources to the tenant in the case of a software failure, hardware failure or platform unavailability due to administrator activities, etc. Incoming calls distributed to a tenant may always be directed to the active platform unless the tenant is reconfigured to direct the incoming calls to an inactive platform. For some example embodiments, the inactive platform is operational and the primary platform is operational, even when all calls are being processed by the active platform. This can be advantageous when there are problems with the active platform since switching the operations to the inactive platform may not cause too much delay in the call handlings associated with the tenant. The inactive platform may be re-classified as an active platform at the time operations are switched.

For some example embodiments, the multiple platforms in the platform layer 306 may share the same data in the storage layer 304. The storage layer 304 may be associated with databases and associated database machines. The storage layer 304 may itself be partitioned into multiple images for redundancy and recovery and for efficient access. For some example embodiments, mappings may be used to relate a tenant on a particular platform to the tenant's data in the storage layer 304.

Thus, the contact centers 102, 202, 302 may include logic to receive calls, to determine to which of the multiple supported tenants the calls belong, to distribute the calls to the appropriate platform, and to determine where the data associated with the tenant may be found.

Using the organization described above, the contact centers 102, 202, 302 may be easily upgraded and maintained with little or minimal impact to the tenant. For example, a tenant may be operating with a inactive platform while the primary platform is upgraded from one software level to another software level. Once the upgrade is completed, operations may be switched back to the primary platform. Similarly, because both the primary platform and the inactive platform share the same data in the storage layer 304, switching from the inactive platform to the primary platform can be accomplished with minimal impact to the tenant and system availability. It may be noted that some calls may be affected during the switch; however, as is typical with telephone calls, the customers may re-dial or call the tenant again. It may be likely that the re-dialed calls may be received by the example contact center 102 after the switch is complete.

Referring to FIG. 2, platform machines 224-226 may be communicatively coupled with an extraction module 232 via communication channels 227-229, respectively, and communication channel 230. Platform machines 224-226 are further communicatively coupled to contact machine(s) 258. The contact machine(s) 258 are communicatively coupled with the routing databases 268 via the communication channel 266.

Platform management machine(s) 244 are shown to be communicatively coupled with configuration data location databases 252 via communication channel 250, the tenant location database 247 via communication channel 249 and with the contact machine(s) 258 and platform machines 224-226, respectively, via the communication channels 256 and 264. The platform management machine(s) 244 are further shown to be communicatively coupled with the configuration module 236 via communication channel 242, while the configuration module 236 is communicatively coupled with the extraction module 232 and the configuration data databases 240 via communication channels 234 and 238, respectively. The machines and modules of FIG. 2 are to be described in further detail with respect to FIG. 4, which follows.

Figure 4:
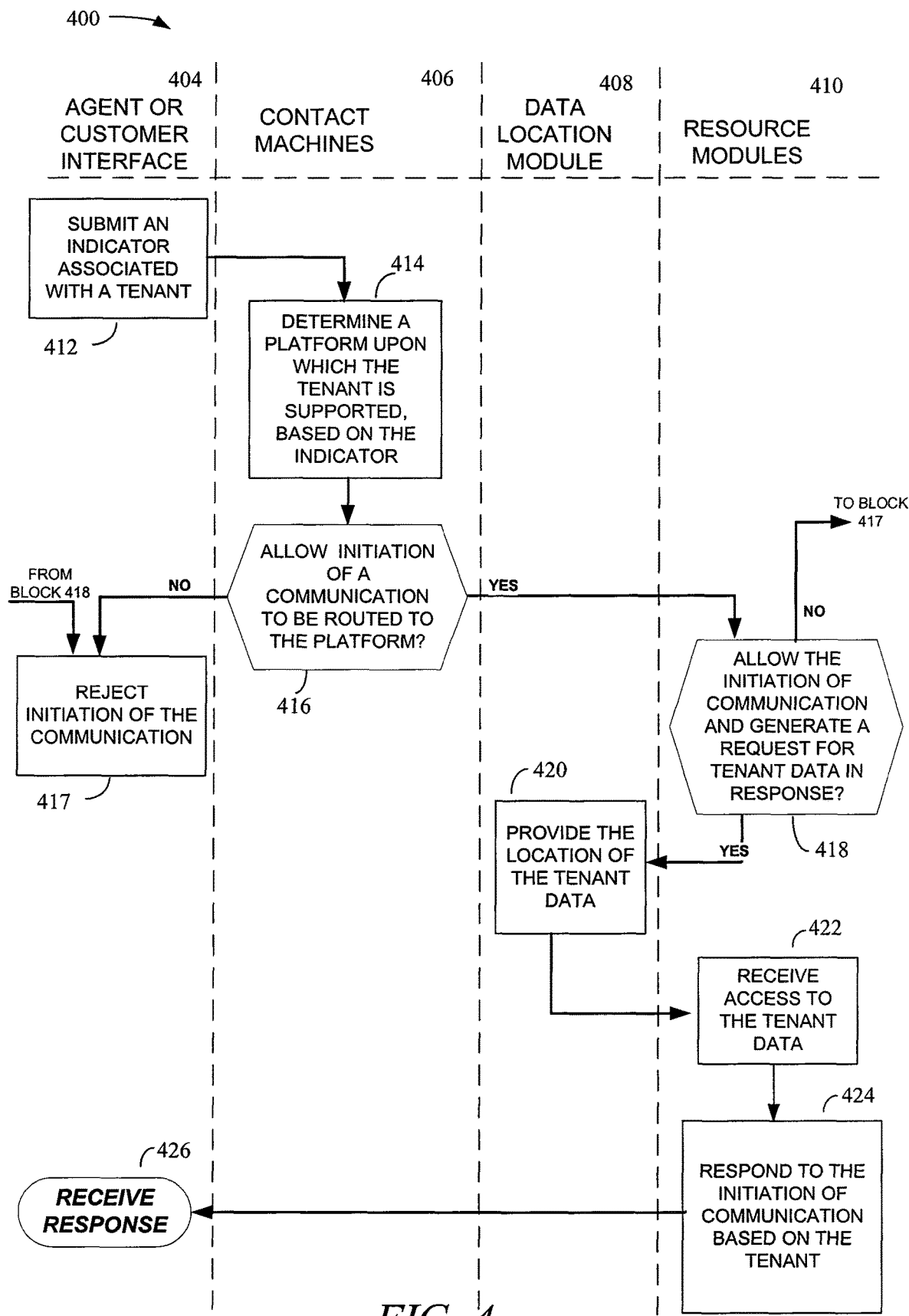
FIG. 4 is a flow diagram illustrating example actions performed by various on-demand contact center components in response to agent or customer contact, according to an example embodiment.

FIG. 4 is a flow diagram 400 showing example actions performed by various components of a contact center for responding to agent or customer contact, in accordance with an example embodiment. In FIG. 4, each column represents a lane in which action(s) are carried out. Actions in lanes 404, 406, 408 and 410 may be performed by certain machines and/or modules shown in FIG. 2. It may be noted that a module may represent software, hardware and/or a combination of software and hardware used to implement logical constructions and/or to process instructions. Although shown in separate lanes, one module may be included in, or composed of, one or more of the other modules.

The flow diagram 400 may begin at block 412 with an agent or customer submitting an indicator associated with a tenant along with an initiation of communication. In FIG. 2, the customer machine 212 is shown to include a telephonic interface 219 (e.g., a telephone with a handset). In an example embodiment, a customer seeking customer support from a tenant dials a tenant's phone number on a telephone to place a call (e.g., initiation of communication) to the contact center over the PSTN. In an example embodiment, the telephone number itself serves as an indicator of the tenant whose attention is sought by the customer.

The customer machine 208 is shown to include a network interface 203 (e.g., a web browser) with which a customer may, for example, submit a chat request to the networked contact center 202 over the Internet to receive, for example, technical support from a tenant. An agent of the tenant or a contact supervisor may also contact the tenant. In an example embodiment, an agent using the agent machine 206 uses the network interface 201 to log on to an agent network server hosted by the networked contact center 202 to notify the networked contact center 202 that the agent is available to be contacted by customers. In some example embodiments, the agent may use the voice interface 217 to speak with a customer or another agent.

In various example embodiments, the indicator submitted at block 412 is received by the contact machines(s) 258. In FIG. 2, the contact machine(s) 258 are shown to include a routing module 262 and a contact limiting module 260. The routing module 262 may route contacts to a certain platform depending on the tenant indicated by the indicator (e.g., a phone number, username/password or any other indicator designating a tenant). The example contact limiting module 260 may regulate incoming contact with the networked contact center 202.

At block 414, the routing module 262 within the contact machines 258 of FIG. 2 may determine a platform upon which the tenant is supported based on the indicator received from the agent or customer at block 412. In an example embodiment, in FIG. 2, the routing module 262 accesses the routing databases 268 via communication channel 266 to associate an indicator with a tenant and a platform. In some example embodiments, the contact machine(s) 258 submit a request, via the communication channel 256 to the platform management machine(s) 244 to determine a platform associated with the indicator (e.g., and a tenant corresponding to the indicator).

At decision block 416, the example flow diagram 400 includes the example contact limiting module 260 within the contact machines 258 of FIG. 2 determining whether to allow the initiation of communication (e.g., a telephone call from a customer) to be routed to a platform (e.g., the platform machine(s) 224).

The contact limiting module's 260 determination of whether to allow the initiation of communication may include referencing a current allowance of contact or communication (e.g., a bucket value, described in more detail below) to be received by a particular communication layer or platform (e.g., within the platform machines 224) in a fixed period of time. In some example embodiments, each platform may vary a maximum allowance of contact for a period of time or vary the period of time based on an availability of platform resources. In some example embodiments, when contact directed to a platform is received by the contact machines 258 and the current allowance is less than or equal to zero, the contact limiting module 260 may reject initiation of the communication as shown in block 417 of FIG. 4. When the contact directed to the platform is received by the contact machines 258 and the current allowance is greater than or equal to one, the contact limiting module 260 may allow the initiation of communication to be routed to the platform as shown between blocks 416 and 418 of FIG. 4.

Alternatively or additionally, determination of whether to allow the initiation of communication may be made by a platform at block 418 after the contact limiting module has allowed the initiation of communication to be routed to the platform at block 416. In various example embodiments, a platform may reject the initiation of communication based on availability of platform resources or other conditions warranting a rejection. Such a rejection is represented by block 417.

In an example embodiment, in FIG. 2, a platform may allow the initiation of communication from the contact machines(s) 258. Example resource module(s) 270 located on the platform machine 224 and located on the other platform machines 225-226, may include various modules that provide services for multiple tenants. Example resource module(s) 270 may include interaction routers, interactive voice recordings, scripting, agent network server, media control and other contact center related services, etc.

In an example embodiment, the initiation of communication is a voice call from a customer seeking help with installing a water heater; the tenant is in the business of providing technical support for refrigerator installations and water heater installations. The tenant employs some agents who address questions about refrigerator installations while the tenant's other agents address questions about water heater installations.

At block 418, the flow diagram 400 includes the resource module(s) 270 of FIG. 2 allowing the initiation of communication and generating a request for data associated with a tenant, based on the initiation of communication. In the appliance installation example, the resource module(s) 270 request tenant data to be used to teleprompt the customer, prompting the customer to press 1 on their telephone dial for refrigerator installation support or to press 2 for water heater installation support.

Example platform machine(s) 224, 225 and 226 may initially request the data associated with the tenant from the extraction module 232 and the configuration module 236. In an example embodiment, to locate data for data access, the resource module(s) 270 may use a different addressing system than the configuration module 236 uses to locate and access the same data. In some example embodiments, the extraction module 232 translates requests from the platform machine(s) 224, 225, 226 to allow the configuration module 236 to understand the request. The configuration module 236 may access the requested data in the configuration data databases 240 and relay the requested data to the resource module(s) 270 on a set of platform machine(s) (e.g., platform machine(s) 224) via the extraction module 232.

The configuration module 236 may not initially locate the requested data in the configuration data databases 240. In some example embodiments, the configuration module 236 may request the location of the requested data from the data location module 246 that may be located within the platform management machine(s) 244.

At block 420, the flow 400 may include the data location module 246 providing the location of the requested data (e.g., the location within the configuration data databases 240) to the configuration module 236. The configuration module 236 may then access the requested data to provide it to the resource module(s) 270 via the extraction module 232.

At block 422 of the flow 400, the example resource module(s) 270 receive access to the requested data (e.g. tenant data). With access to the particular tenant data, an example resource module 270 may generate a particular response to the initiation of communication received from the agent or customer.

At block 424 of the flow 400, the resource module(s) 270 respond to the initiation of the communication based on the data (e.g., the tenant data). The agent or customer that initiated communication may receive the response where the flow ends at terminal 426. In the appliance installation support example, the response to the initiation at terminal 426 may be the tenant's teleprompter asking the customer to indicate the nature of the call.

User Interface

Figure 5:
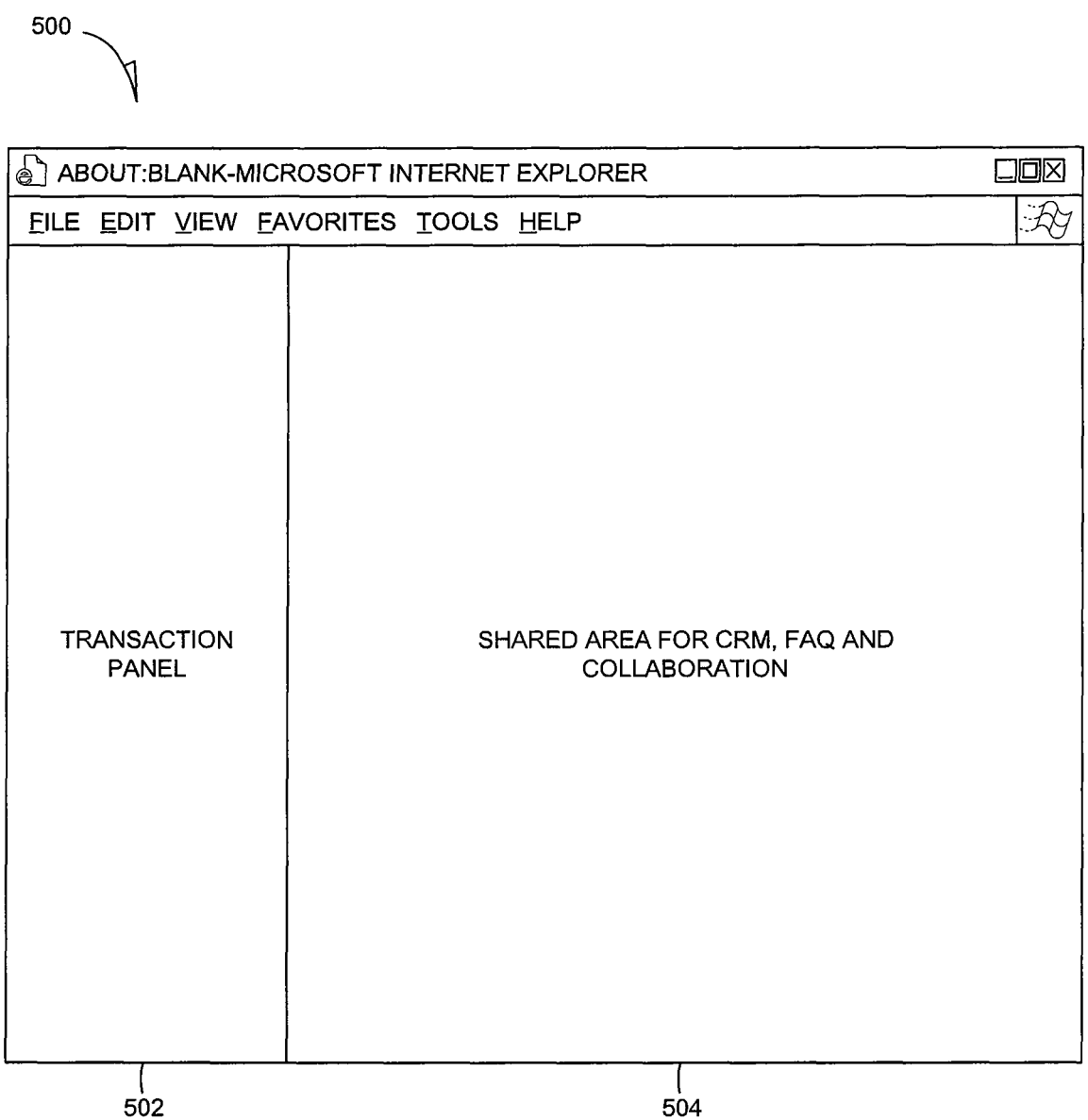
FIG. 5 is a mock-up web interface, in accordance with an example embodiment.

FIG. 5 is a mock-up web interface 500, in accordance with an example embodiment. The web interface may be generated by a web server that relates to the networked contact center and may be accessed over the Internet via a web browser. Example embodiments may be used by a supervisor or an agent to manage contacts. The contact center may route contacts, such as voice, chat and email communications, to a particular agent, group and/or queue and display information associated with the contact via the example web interface 500. A user, such as an agent or supervisor, may log on to the example web interface to obtain access to information within the networked contact center. In some example embodiments, a user may initiate and respond to contacts with the web interface 500. Sub-window 502 of the web interface 500 may be referred to as a transaction panel, and sub-window 504 may be referred to as a shared area.

Figure 6:
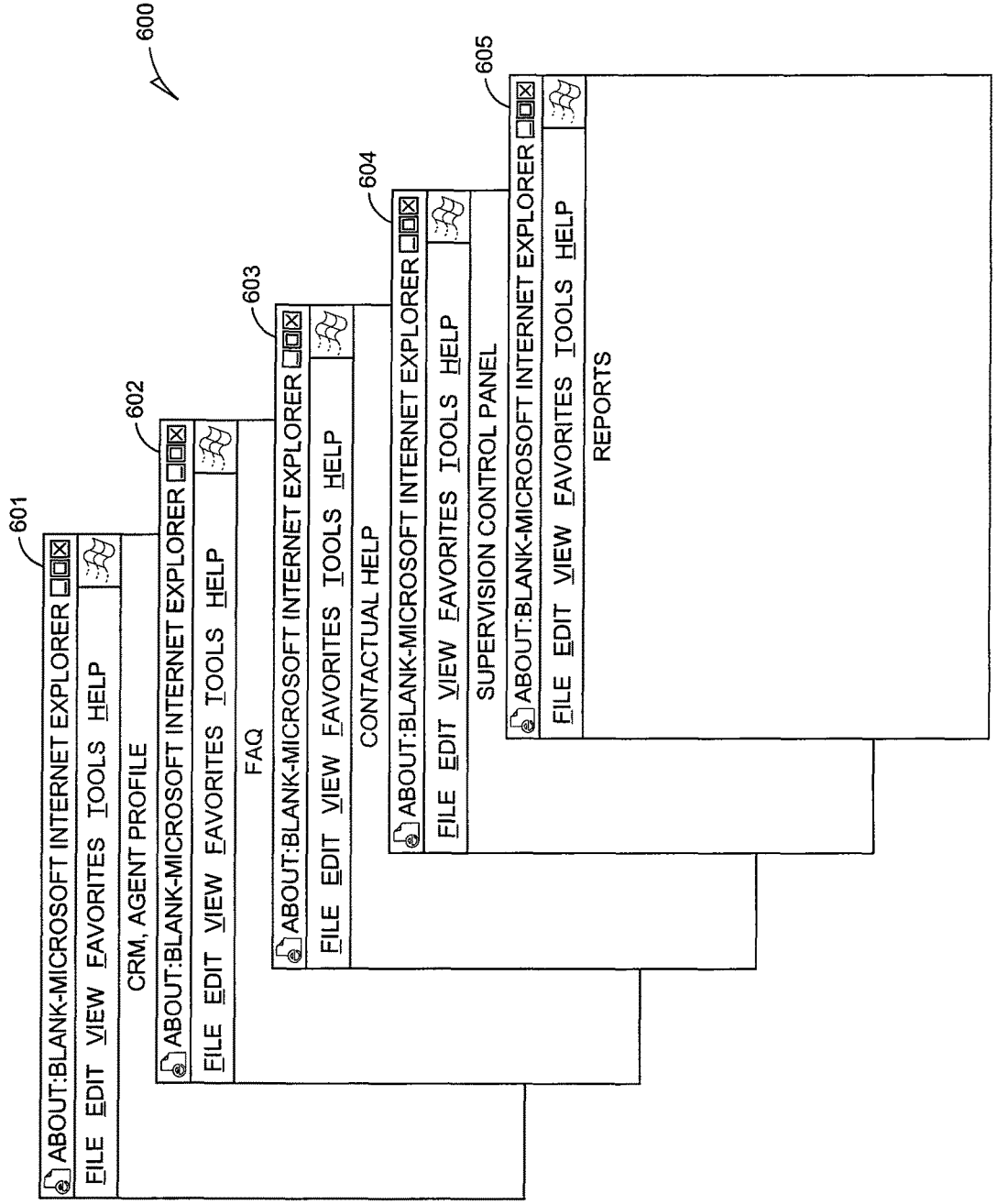
FIG. 6. is a graphical diagram showing example windows for a shared area of the mock-up web interface, in accordance with an example embodiment.
Figure 7:
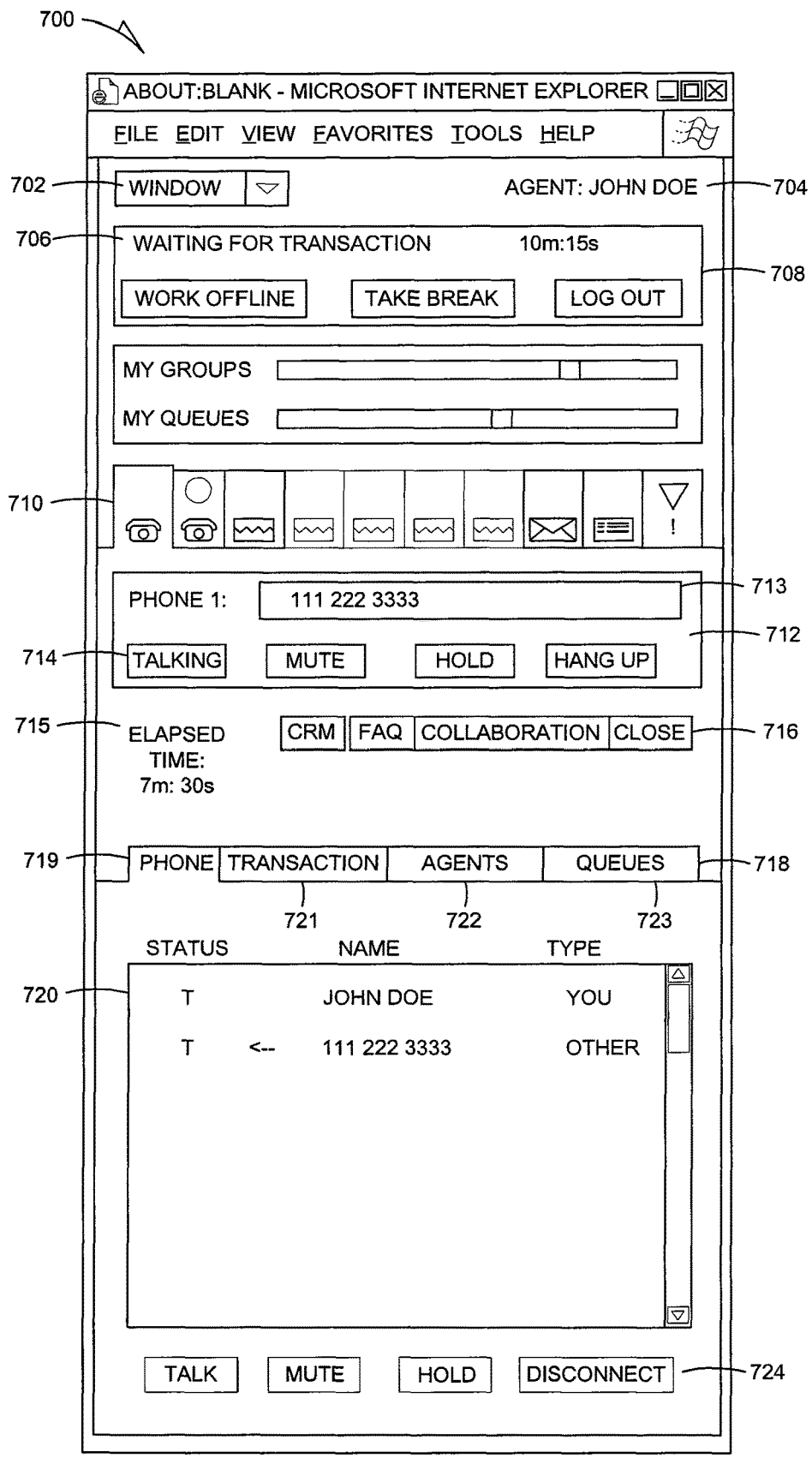
FIG. 7 shows an example transaction panel, in accordance with an example embodiment.

FIG. 6 is a graphical diagram 600 showing example windows 601-605 that may be displayed in the shared area 504 of the mock-up web interface 500, in accordance with an example embodiment. Some example shared windows may include a frequently asked questions (FAQs) window 602 and a help window 603. A customer relationship management (CRM) and agent profile window 601 may be used to access customer and agent information. A supervision window 604 may be accessed by an agent supervisor to view agent or group performance information or any other information useful to a supervisor. A reports window 605 is to display generated contact center related reports, FIG. 7 shows an example transaction panel 700, in accordance with an example embodiment. An agent or contact supervisor may employ the transaction panel 700 to manage contact relating to a network contact center.

The transaction panel 700 may include one or more frames. In general, a frame or frames occupy space (e.g., a footprint) on the transaction panel 700, and may be used to convey information (e.g., visual information) and/or to provide functionality associated with a networked contact center. In an example embodiment, a frame may include sub-frames that may be associated with the frame in different manners. It may be noted that a frame as used herein is not limited to being used or being generated with any particular programming language(s); a frame as used herein may be generated using various programming languages and the concept of a frame may be extended to various programming environments. In an example embodiment, a frame is a selectable toggle button and a user may interact with the toggle button by selecting it. The toggle button may display text that indicates a function that will be initiated when a user toggles the button. As used herein, the words "frame" and "indicator" may be used interchangeably. One or more web servers may generate output and receive input via the frames of the example web interface 500.

Figure 8:
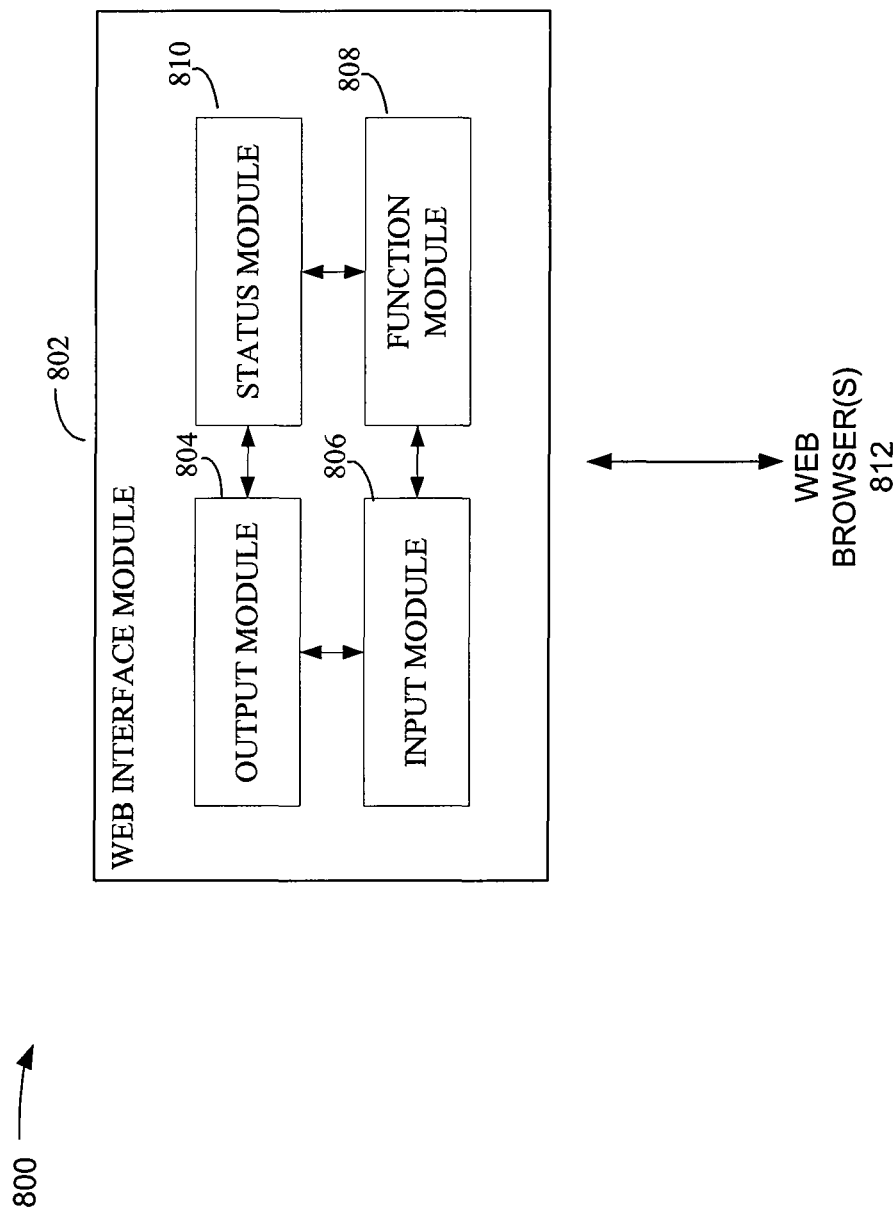
FIG. 8 is a block diagram showing an example web interface module communicatively coupled to one or more web browsers, in accordance with an example embodiment.

FIG. 8 is a block diagram 800 showing an example web interface module 802 (e.g., a web server) that is communicatively coupled with one or more web browsers 812, in accordance with an example embodiment. The example web interface module 802 is shown to include an output module 804 that is communicatively coupled with an input module 806 and a status module 810. The input module 806 is further communicatively coupled to a function module 808. The example web interface module 802 and its components 804, 806, 808 and 810 may provide certain functionality that may be implemented with hardware, software or a combination of hardware and software. In various example embodiments, all or part of the web interface module 802 is implemented using HyperText markup language (HTML). Other software languages (e.g., Java, etc.), may alternatively or additionally be employed to create and manipulate example frames in a web interface.

The output module 804 may present a frame on an example web interface such as a web page served to a web browser 812. The output module 804 may present frames with different formats and capabilities. In an example embodiment, the output module 804 presents an example frame that includes text (e.g., "Dial") and is initially a selectable toggle button or switch to initiate a function. Alternatively or additionally, the toggle button may initially be un-selectable and display text indicating a status (e.g., dialing). The output module 804 may output other information related to a capability of a frame.

The input module 806 is to detect user interaction with a frame. A user interaction with a frame includes input provided to a web browser by the user. For example, input may include a keystroke, a mouse click, a voice command, a computer generated input, or any other input to a machine interface. The input module 806 may transmit a signal to the output module 804 and/or the function module 808 upon detecting the user interaction. For example, the input module 806 may register a selection of the selectable toggle button and notify the function module 808.

The function module 808 is to initiate a function associated with a frame presented by the output module 804. In an example embodiment, a function may be initiated in response to a frame being selected, as detected by the input module. The function module 808 may signal the output module 804 regarding initiation of the function.

The status module 810 is to detect a state associated with a networked contact center and report a status and/or status change to the output module 804 and/or the function module 808. In an example embodiment, the status module detects that communication between an agent and a customer has been temporarily suspended (e.g., on hold) and may notify the output and function modules 804, 808.

Returning to FIG. 7, the transaction panel 700 is shown to include a drop down menu 702 (e.g., a frame) that allows for user selection of various sub-windows to cause windows 601-605 to be displayed by a user interface (e.g., a screen). A current user indicator 704 (e.g., a further frame, etc.) indicates a name of a current user logged on to the contact center web interface module 800. The status panel 706 is a frame that includes sub-frames to display and/or allow control over a user's current status and the elapsed time since the start of a current status. The example status panel 706 allows the user to change his or her status (e.g., by pushing a button to take a break or to log out). A group and queue status indicator 708 may be an interface that gives a user an overview of the current status of a group of users and/or a contact queue. In some example embodiments, the status indicator 708 shows an amount of contact with the group and/or in the queue relative to a maximum capacity of contact that may be received.

A tab selector bar 710 may include multiple tabs that are selectable to switch between channels of communication. For example, one tab may be selected to display information about a telephone call while another tab may be selected to display different information about a simultaneously connected telephone call, chat session or email. Other forms of communication not described may be represented by tabs in the tab selector bar 710. For each channel of communication selected, the transaction panel 700 may display a different interaction control panel 712. In an example embodiment, the communication channel is analog voice and the interaction control panel 712 shows a telephone number 713 of a customer interacting with an agent. The interaction control panel 712 may include buttons 714 that may be selectable or un-selectable by an agent to affect current communication (e.g., mute button, hold button, and hang up button).

The window selector 716 may be used to select (e.g., via sub-frames CRM, frequently asked questions (FAQ), collaboration, close, etc.) different windows and corresponding content to be displayed in the shared area 504. Toggling of an example sub-frame within the frame 716 may show and hide the frame 504, for example, by changing the width of the window 500 to display frame 502 alone or with frame 504. Each channel selected under the tab selector bar 710 may correspond to its own set of windows, which are selectable by the window selector 716. Each interaction occurring over a particular channel may be timed. An example time display 715 may display an elapsed time for each channel of communication. Each particular channel may include a tabbed set of sub-panels 718. An example sub-panel 719 includes a phone sub-panel 720 that may display a current status (e.g., talking, dialing, ringing, etc.) of a call, the participants of the call and any other call information that may be appropriate for a responding agent to access. Other sub-panels such as a transaction sub-panel 721, an agents sub-panel 722 and a queues sub-panel 723 may be selectable to display corresponding contact center information. Further status control buttons 724 may be included to allow a user to influence state of communication.

Figure 9:
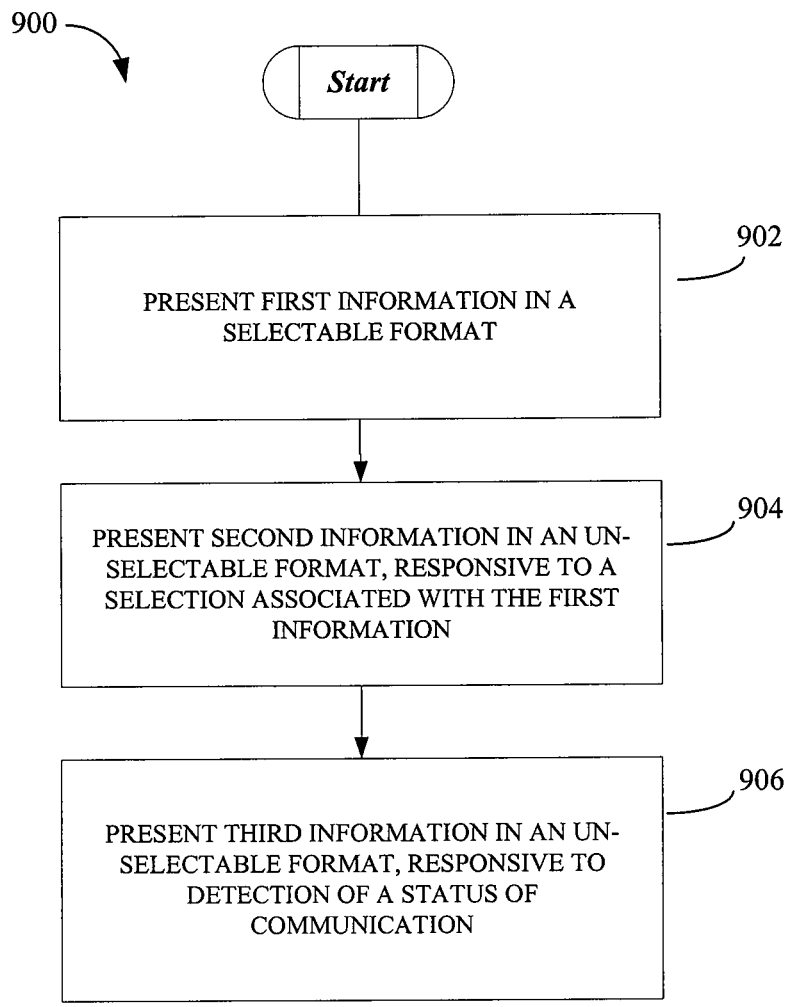
FIG. 9 is a flow diagram illustrating an example method for presenting a frame on a user interface, in accordance with an example embodiment.
Figure 10:
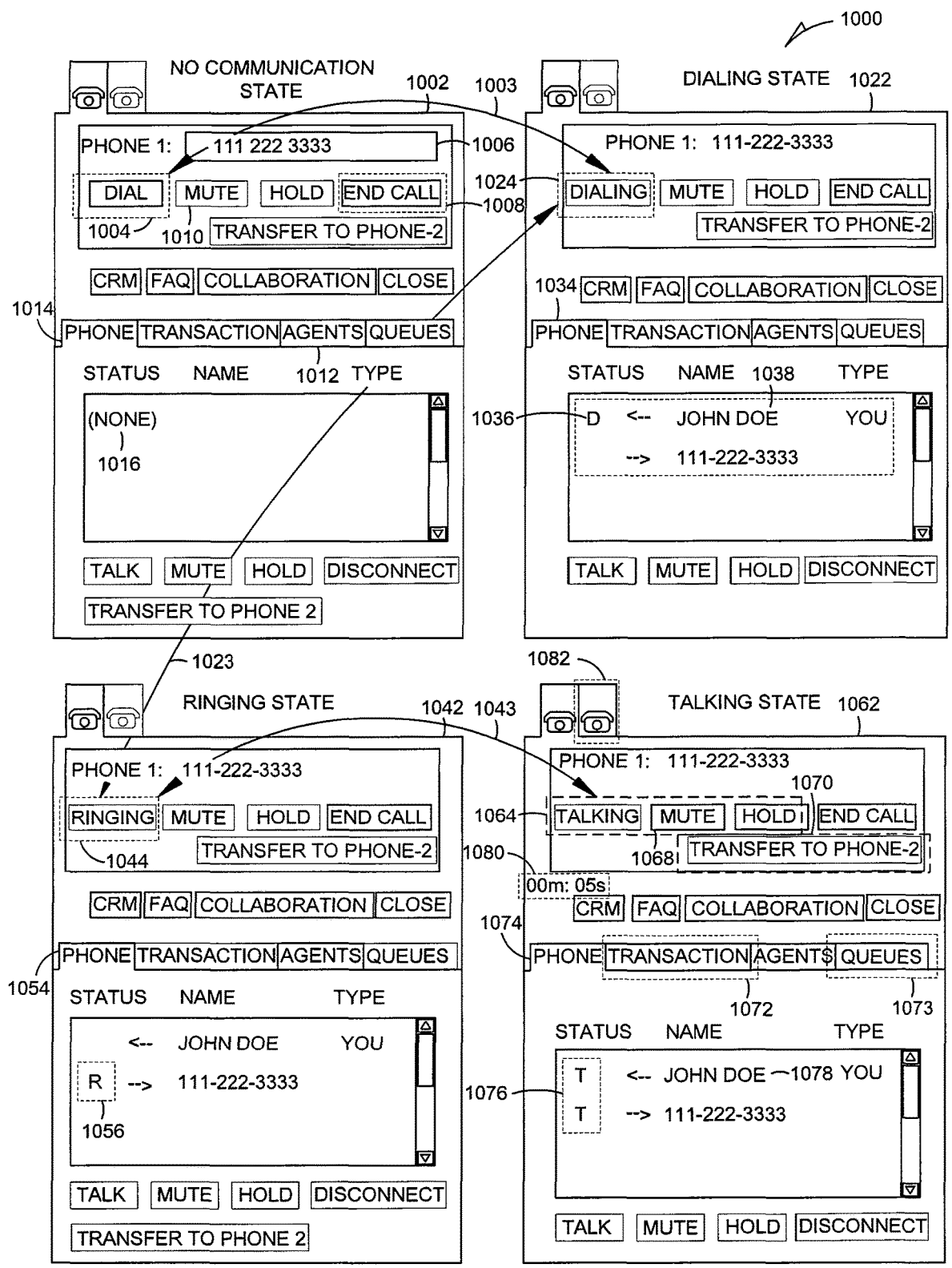
FIG. 10 is a graphical state diagram illustrating user placement of an outgoing call using a transaction panel, in accordance with an example embodiment.

FIG. 9 is a flow diagram illustrating an example method 900 for presenting a frame on a user interface, in accordance with an example embodiment. The example method 900 may be performed by the web interface module 802 of FIG. 8. The example method 900 may be performed with respect to the user interface of FIGS. 5-7 and 10. FIG. 10 is a graphical state diagram illustrating user placement of an outgoing call using a transaction panel 700, in accordance with an example embodiment. The example method 900 may be illustrated in state transitions 1003, 1023 and 1043 included in the state diagram 1000 of FIG. 10.

At block 902, the example method 900 includes presenting first information in a selectable format. In some example embodiments, the first information presented may include the word "Dial" on the button 1004. Information presented with a frame (e.g., "Dial" on the frame 1004) may represent a function, and selection of the frame may activate the function. In various example embodiments, the output module 804 provides a selectable frame 1004 in response to the input module 806 indicating that all or part of a phone number is entered into the frame 1006 as shown. In an example embodiment, the output module 804 may generate a selectable frame 1004 when the status module 810 detects that the voice channel is in a state of no communication 1002. It may be noted that under the phone tab 1014, status of communication indicates "none" 1016. Alternatively or additionally, the output module 804 may present the selectable button 1004 in response to the input module 806 indicating that a particular agent listed (not shown) under the agent tab 1012 has been highlighted by a user. Other frames such as the frame 1010 that includes the word "Mute," may be presented by the output module 804 as being un-selectable as there may not yet a be a call in-progress to mute. The output module 804 may present the button 1008 including the words "End Call" (e.g., a function to be provided by the function module 808) as being selectable to remove any input to the frame 1006, which may in turn cause the output module 804 to present the dial button 1004 as being un-selectable.

At block 904, the method 900 may include presenting second information in an un-selectable format, responsive to a selection associated with the first information. A user may select the frame 1004 to dial a call by interacting with (e.g., clicking on) the frame 1004. In an example embodiment, the input module 806 is to register selection of the frame 1004 and transmit a signal to notify the output module 804 and the function module 808 of the selection. In response to registering the selection of frame 1004, the example function module 808 may initiate a function, such as a dial function, to place a call to the phone number entered into the frame 1006. The status module 810 may detect a transition 1003 if the state of the call has transitioned from a no communication state to a dialing state. Information presented with frames (e.g., "Dialing" on the frame 1024) may represent a status associated with a function. Under the phone tab 1034, the status of communication shows "D" 1036 indicating dialing when a number has been dialed. In the same row as the "D," the phone tab 1034 is also shown to include a name (e.g., "John Doe") 1038 indicating that dialing relates to the caller by that name 1038. In an example embodiment, the output module 804 may provide the frame 1024 with second information, such as "Dialing," and may provide the frame 1024 as being un-selectable.

Although example embodiments are explained with respect to a voice call, it may be noted that other forms of communication may be supported by the transaction panel 700. For example, a transaction panel may be used as an interface for chat and/or email communications. In an example embodiment, the transaction panel 700 serves as an interface for voice, chat and email communications.

In some example embodiments, the communication is between a tenant's agent and the tenant's customer. Two of the tenant's agents may also communicate with each other using one or more transaction panel. Some example embodiments relate to communication between the agent and the networked contact center. Of course, the transaction panel may be configured to facilitate communication between various different entities without departing from the spirit of the claimed subject matter. For example, a toggle button may be provided, that when selected, initiates ending a chat session between an agent and a customer or any other entities participating in a communication.

At block 906, the method 900 includes presenting third information in the un-selectable format, responsive to a detection of a further status of communication. The third information may represent a further status (e.g., relative to the dialing state). In an example embodiment, the status module 810 may detect that the status of a call has transitioned 1023 from a dialing state 1022 to a ringing state 1042. The voice channel in the ringing state 1042 is shown to include a frame 1044, which is provided by the output module 804 to include the word "Ringing" and to be un-selectable. Under the phone tab 1054, when a number has been dialed, the status of communication shows "R" 1056 indicating that the status of the call is ringing at the call recipient's receiver.

If a recipient answers the call, the status module 810 may detect that the status of the call has transitioned 1043 from a ringing state 1042 to a talking state 1062. The status module 810 may notify the output module 804, which may responsively display certain frames on the transaction panel 1062. In an example embodiment, a transaction panel 1062 is shown in the talking state, which is indicated by the frame 1064 that includes the word "Talking" and the "T" 1076 in the status column of the phone tab 1074. It may be noted that the "T" is included in the same rows 1078 as the name of the caller and the name of the user being called, indicating that talking relates to each user.

Figure 11:
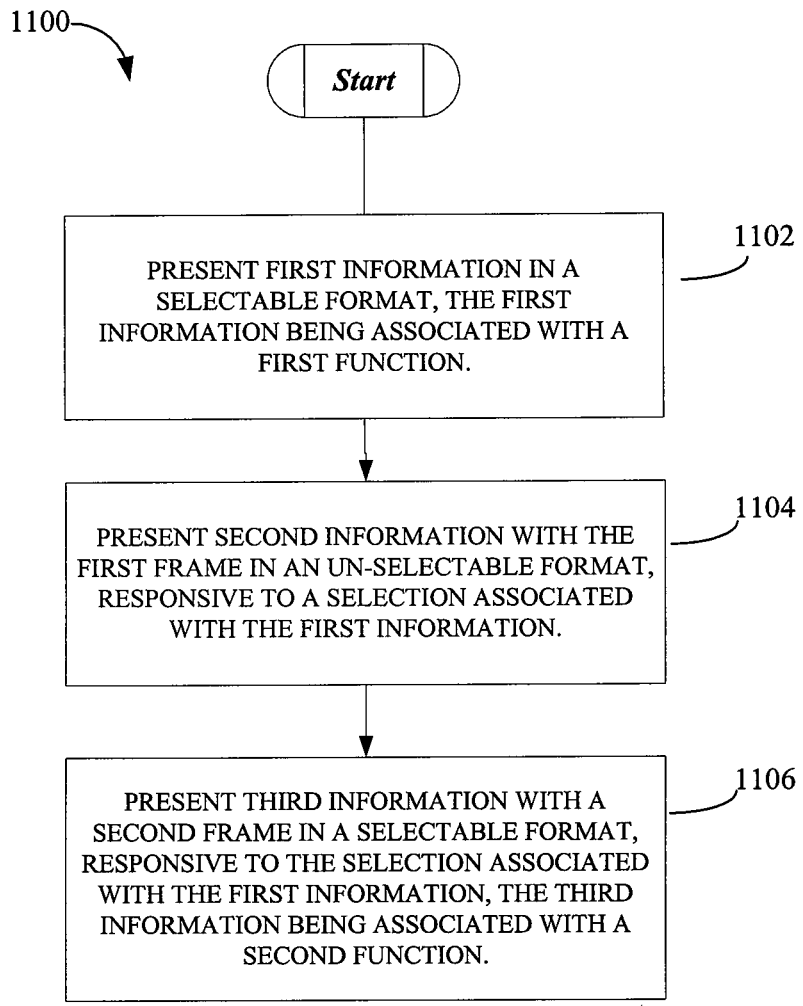
FIG. 11 is a flow diagram illustrating a further example method for presenting a frame on a user interface, in accordance with an example embodiment.

FIG. 11 is a flow diagram illustrating a further example method 1100 for presenting a frame on a user interface, in accordance with an example embodiment. Blocks 1102 and 1104 may be substantially similar to blocks 902 and 904 of FIG. 9. At block 1106, the method 1100 may include presenting further information with a second frame (e.g., frame 1068) in a selectable format in response to the initial selection (e.g., the selection of the frame 1004 to "Dial"). In some example embodiments, the further information (e.g., "Mute" on the frame 1068) is associated with a further function (e.g., a mute function).

In an example embodiment, where a recipient answers a ringing receiver, the status module 810 may notify the output module 804 that the call status has transitioned from the ringing state 1042 to a talking state 1062. Responsive to the initial selection of the frame 1004 and the subsequent talking status 1062, the output module 804 may display a further selectable frame such as the frame 1068 including the word "Mute." In an example embodiment, the mute button on frame 1068 becomes available when in the talking state 1062 and may be selected to temporarily suspend an in-progress call. Other frames that may become available include the frame 1082, which represents an available channel, the frame 1070 to transfer a call and the frames 1072, 1073 that are to be discussed in more detail below. As disclosed above, a time display frame 1080 may display the time elapsed in minutes and seconds since the call was first connected.

Figure 12:
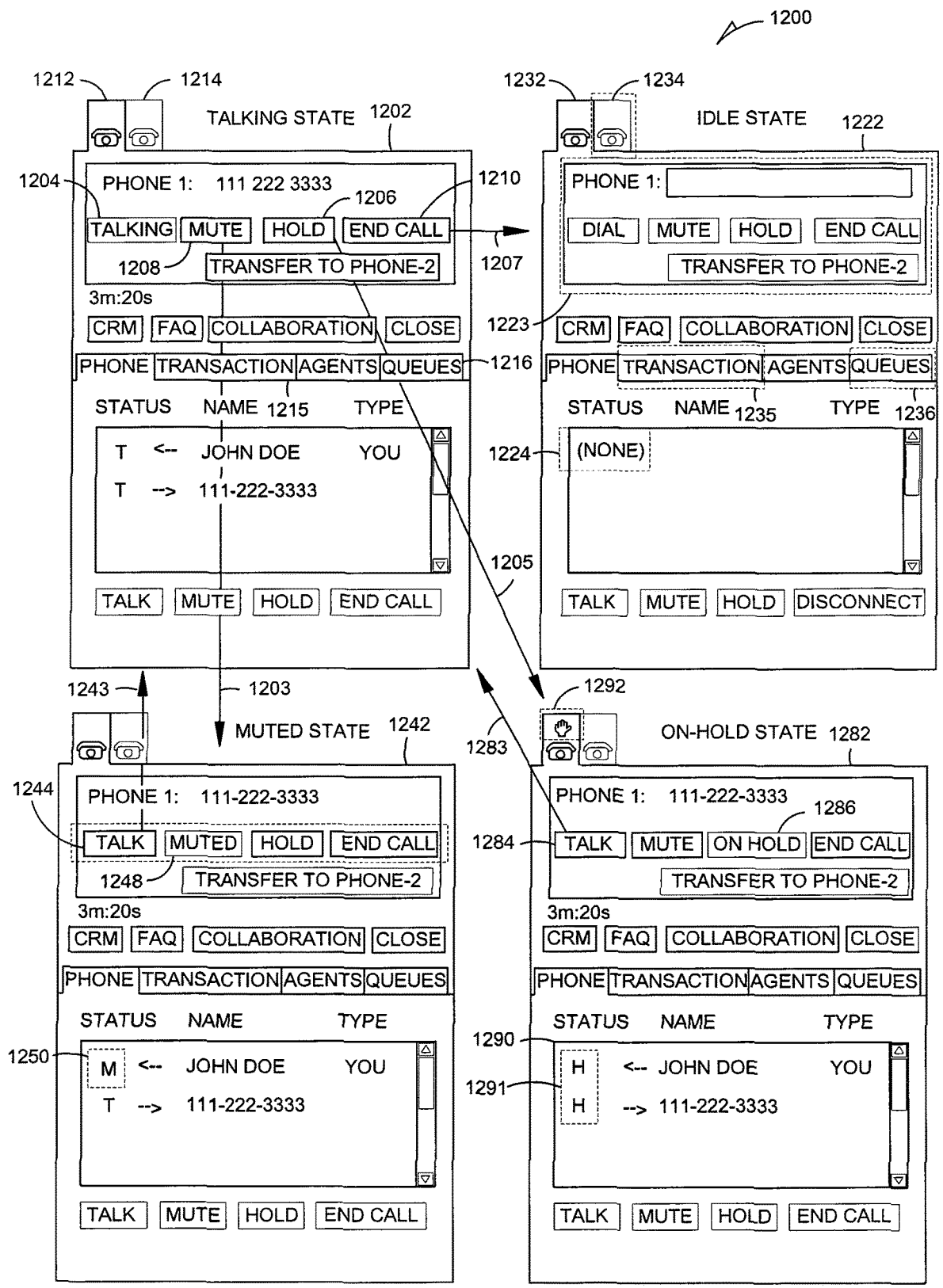
FIG. 12 is a further graphical state diagram illustrating state transitions out of the talking state, in accordance with example embodiments.

FIG. 12 is a further graphical state diagram 1200 illustrating state transitions out of the talking state 1202, in accordance with example embodiments. The figure illustrates further example embodiments illustrating the claimed subject matter.

The voice channel may transition 1203 from the talking state 1202 to the muted state 1242. When the frame 1208 (e.g., the "Mute" button) is selected, the input module 806 may register the selection and notify the function module 808 and the output module 804 of the selection. The function module 808 may initiate a mute function in response to the selection of the frame 1208. The output module 804 may display the frame 1248 with the word "Muted" on an un-selectable button. In an example embodiment, the information on the selectable frame (e.g., frame 1208, the "Mute" button) is associated with one status (e.g., the frame 1204, the talking status of communication), while the un-selectable frame (e.g., the frame 1248, the "Muted" button) is associated with another status of communication (e.g., the frame 1248, the muted status of communication). It may be noted that after the mute function is initiated, "Talking," the status that was indicated on the un-selectable frame 1204 in the talking state 1202, is replaced with "Talk," a function on the selectable frame 1244. The status under the phone tab may show "M" 1250 to indicate that John Doe is muted. Upon selection of the frame 1244, the transaction panel may transition 1243 from the muted state 1242 back to the talking state 1202. Other frames may become selectable or un-selectable in response to the mute function being initiated.

As disclosed above, additional frames may be affected by an initial selection of the frame 1004 (e.g., "Dial") and the subsequent transition to talking status of communication. In various example embodiments, the output module 804 may generate the additional frames in response to signals from the input module 806, indicating user input, and/or the status module 810, indicating change of state. For example, frames providing tabs 1215 and 1216 may become selectable to access information that is specific to the particular call that has been connected (e.g., frame 1215, "Transaction") and/or to access information related to queues associated with the call (e.g., frame 1216, "Queues"). In an example embodiment, connection of a call may cause a frame providing a tab selector bar 1214 to become selectable. In some example embodiments, when selected, the tab selector bar 1214 allows access to voice channel information relating to a telephone connection (or e.g., potential connection) other than the telephone connection associated with selector tab 1212 of the transaction panel in the talking state 1202.

Selection of the frame 1206 (e.g., the "Hold" button) may result in an active connection being temporarily suspended. Based on a signal from the input module 806, the function module 808 may initiate a state transition 1205 from the talking state 1202 to the on hold state 1282. The output module 804 may change the display on the frame 1206 from "Hold" to "On Hold" as displayed on frame 1286. It may be noted that while in the on hold state 1282, the frame 1292 displays a hand icon on the tab that represents a telephone line, to indicate that the telephone line is on hold. An "H" 1290, 1291 may also be displayed to indicate that call participants are on hold. A user may transition 1283 back to the talking state by selecting the frame 1284, initiating the talk function as in the transition from the muted state 1242 to the talking state 1202

Selection of the frame 1210 (e.g., an "End Call" button) may result in an active connection being terminated. Frames in the transaction panel may indicate a transition 1207 from the talking state 1202 to the idle state 1222. In an example embodiment, the frames located in the interaction control panel 1223 become un-selectable when the transaction panel is in the idle state 1222. The available channel of communication 1234 may no longer be shown as selectable since the first channel represented by the frame 1232 is no longer occupied. As shown, in the idle state 1222, the status 1224 may be labeled as "none" and the frames 1235 and 1236 may no longer remain selectable to view call related transaction or queue information.

A frame that may display different information under different circumstances and that may vary selectability under different circumstances may be used for other contact center activity. For example, a transaction panel may be used to answer a call that has been directly dialed, transferred from another entity and/or taken from a queue of calls. Chats and emails may be initiated, answered and/or transferred. The claimed subject matter may be practiced with respect to numerous other applications that include the presentation of varying information by a frame where the information presented relates to whether or not the frame is selected by a user.

Figure 13:
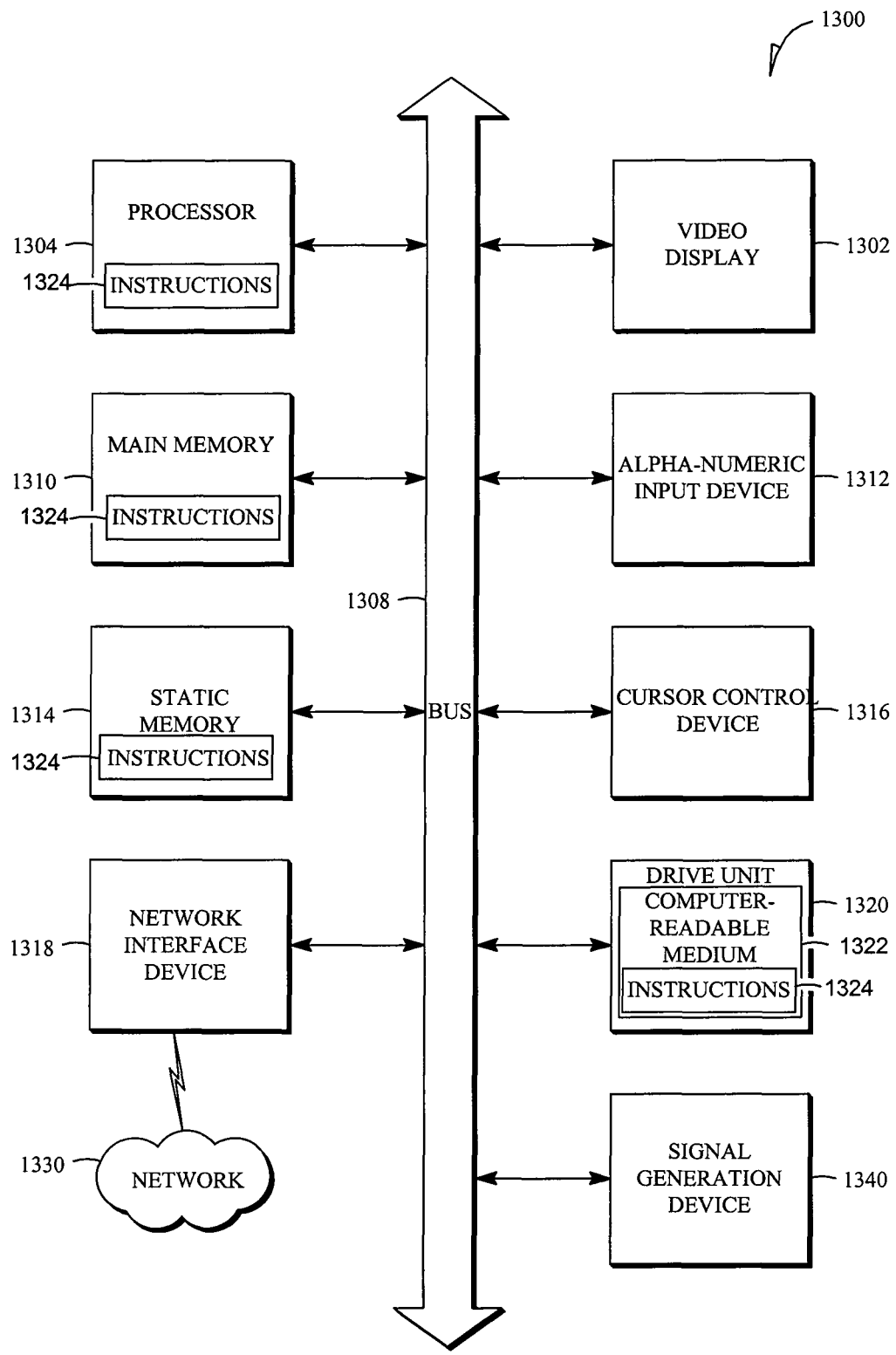
FIG. 13 is a block diagram illustrating an example machine, in accordance with an example embodiment.

FIG. 13 shows a diagrammatic representation of a machine in the example form of a computer system 1300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a PC, a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1304 (e.g., a central processing unit (CPU), a graphics processing unit (GPU) or both), a main memory 1310 and a static memory 1314 which communicate with each other via a bus 1308. The computer system 1300 may further include a video display unit 1302 (e.g., a liquid crystal display (LCD) or a cathode ray tube (CRT)). The computer system 1300 also includes an alphanumeric input device 1312 (e.g., a keyboard), a cursor control device 1316 (e.g., a mouse), a disk drive unit 1320 a signal generation device 1340 (e.g., a speaker) and a network interface device 1318

The disk drive unit 1320 includes a machine-readable medium 1322 on which is stored one or more sets of instructions (e.g., software 1324) embodying any one or more of the methodologies or functions described herein. The instructions 1324 may also reside, completely or at least partially, within the main memory 1310 and/or within the processor 1304 during execution thereof by the computer system 1300, the main memory 1310 and the processor 1304 also constituting machine-readable media.

The instructions 1324 may further be transmitted or received over a network 1330 via the network interface device 1318.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present subject matter. The term "machine-readable medium" shall accordingly be taken to include, but not be limited to, solid-state memories, optical and magnetic media, and carrier wave signals.

The above description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract is provided to comply with 37 C.F.R. § 1.72(b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A non-transitory computer-readable medium including computer-executable instructions which cause a computer to perform a method comprising:
   for communications involving a customer in a networked contact center including data communications circuitry and an agent of a tenant, wherein the customer is a customer of the tenant and the customer is associated with a communication directed to the tenant, assessing information from the networked contact center, the information associated with the communication from the customer and defined by the customer in a viewable frame including a toggle switch that is defined according to a selectable area, the selectable area being selectable via user-input and configured and arranged to display graphical information for identifying a function of the communication;
   transmitting information associated with the communication to the networked contact center to facilitate access to data of the tenant via the agent, based on a displayed graphical user interface including the viewable frame; and
   in response to the selectable area being selected, transmitting to the networked contact center, agent-communication status information for display in the selectable area within the frame.

2. The computer-readable medium of claim 1, further including delivering data-communication services, via a server configured and arranged to function corresponding to the functions of the networked contact center, on behalf of the customer.

3. The computer-readable medium of claim 1, wherein a server, operating with the networked contact center, facilitates communication with the networked contact center.

4. The computer-readable medium of claim 1, wherein a server, operating with the networked contact center, establishes the communication between the customer and the agent, wherein the communication includes at least one of a voice communication or a chat communication.

5. The computer-readable medium of claim 1, further including communicative coupling, via the networked contact center, a second customer of the tenant and a second agent of the tenant, the second customer associated with a different communication directed to the tenant.

6. The computer-readable medium of claim 5, wherein the tenant includes:
   a server communicating with the agent and the second agent corresponding to operations specified for the customer via the networked contact center.

7. The computer-readable medium of claim 5, wherein a server, operating with the networked contact center, facilitates communication with the networked contact center.

8. The computer-readable medium of claim 1, wherein a tenant server communicates data corresponding to the functions of the networked contact center, and the tenant server directs incoming calls from customers to a particular platform, including circuitry for processing the incoming calls, in the networked contact center.

9. The computer-readable medium of claim 8, including operating the tenant server to direct incoming calls from customers to a different platform among a plurality of platforms, in the networked contact center, when the particular platform is unavailable, wherein each of the platforms includes a respective circuit to process incoming calls.

10. The computer-readable medium of claim 9, including operating the tenant server to direct incoming calls from customers to the particular platform when the particular platform is available.

11. The computer-readable medium of claim 8, including operating the tenant server to function corresponding to the functions of the networked contact center, the tenant server configured and arranged to direct incoming calls from customers to a particular platform among a plurality of platforms, wherein each of the platforms includes a respective circuit to process incoming calls.

12. The computer-readable medium of claim 8, including operating the tenant server to facilitate communicative coupling of the customer and the agent via a plurality of platforms, wherein each of the platforms includes a respective circuit to process incoming calls.

13. The computer-readable medium of claim 12, including operating the tenant server to facilitate communicative coupling of a second customer of the tenant and a second agent of the tenant via the plurality of platforms.

14. The computer-readable medium of claim 8, including operating the tenant server to facilitate communicative coupling of a second customer of the tenant and a second agent of the tenant via a plurality of platforms, wherein each of the platforms includes a respective circuit to process incoming calls.

15. The computer-readable medium of claim 14, including operating the tenant server to direct incoming calls from the customer and the second customer to a different platform among the plurality of platforms when the particular platform is unavailable, and operating the tenant server to direct incoming calls from the customer and the second customer to the particular platform when the particular platform is available.

16. A method for use with a networked contact center including communications circuits configured to facilitate incoming calls from customers to a plurality of tenants of the networked contact center, the method comprising:

displaying a toggle switch in a selectable area within a viewable frame for a user of a display, which is selectable via user-input and configured and arranged to display graphical information for identifying a function that is responsive to a selection of the selectable area;

determining one of the plurality of tenants to which a communication of the networked contact center is directed and a platform within the networked contact center associated with the tenant, based on an identifier associated with the communication;

in response to the selectable area being selected, displaying further status-related information in the selectable area within the frame; and in response to determining the one of the plurality of tenants to which the communication of the networked contact center is directed, retrieving a response to provide to one of the customers from data of the tenant via the platform, wherein the platform includes a circuit to process incoming calls.

17. The method of claim 16, further including:

in response to determining the one of the plurality of tenants to which the communication is directed, retrieving from a database identification of the platform and a data storage location associated with the tenant based on the identifier; and retrieving the data for the response to the customer from the data storage location.

18. The method of claim 16, further including:

rejecting initiation of the communication using the platform based on resources of the platform, and then initiating the communication using a different platform within the networked contact center that is associated with the tenant.

19. The method of claim 16, wherein the platform is or includes a data-communications server.

20. The computer-readable medium of claim 1, wherein the networked contact center includes at least one server and is to provide data-communications services.

* * * * *